(12) United States Patent
Matsushita

(10) Patent No.: US 8,863,912 B2
(45) Date of Patent: Oct. 21, 2014

(54) BRAKE CONTROL APPARATUS AND CONTROL LEVER THEREFOR

(75) Inventor: Tatsuya Matsushita, Osaka (JP)

(73) Assignee: Shimano Inc., Osaka (JP)

( * ) Notice: Subject to any disclaimer, the term of this patent is extended or adjusted under 35 U.S.C. 154(b) by 760 days.

(21) Appl. No.: 12/535,704

(22) Filed: Aug. 5, 2009

(65) Prior Publication Data

US 2011/0031079 A1 Feb. 10, 2011

(51) Int. Cl.
  B62L 3/00 (2006.01)
  B60T 11/16 (2006.01)
  B62K 23/06 (2006.01)
  B60T 11/18 (2006.01)
  B60T 7/10 (2006.01)

(52) U.S. Cl.
  CPC ............. *B60T 11/165* (2013.01); *B62K 23/06* (2013.01); *B60T 11/18* (2013.01); *B60T 7/102* (2013.01)
  USPC .......................... 188/24.22; 188/344; 92/128

(58) Field of Classification Search
  USPC ......... 188/24.11, 24.15, 24.22, 344; 403/367, 403/368, 370, 374.3; 92/128; 60/533, 594; 280/288.4; 74/501.6, 502.2, 551.1, 74/551.8
  See application file for complete search history.

(56) References Cited

U.S. PATENT DOCUMENTS

| | | | |
|---|---|---|---|
| 1,526,681 A | | 2/1925 | Round |
| 2,271,273 A | * | 1/1942 | Mueller ........................ 188/344 |
| 4,274,301 A | * | 6/1981 | Katayama .................... 74/551.1 |
| 4,462,267 A | * | 7/1984 | Shimano ......................... 74/489 |
| 4,624,597 A | * | 11/1986 | Johnson et al. ................. 403/16 |
| 5,197,349 A | * | 3/1993 | Herman ........................ 74/551.1 |
| 5,201,242 A | * | 4/1993 | Chi ............................... 74/551.1 |
| 5,285,696 A | * | 2/1994 | Taylor .......................... 74/551.1 |
| 5,540,457 A | * | 7/1996 | Johnson ........................ 280/279 |
| 5,647,684 A | * | 7/1997 | Chen ............................. 403/370 |
| 6,502,675 B1 | * | 1/2003 | Andrus ......................... 188/344 |
| 6,923,089 B2 | * | 8/2005 | Wu ............................... 74/551.9 |

(Continued)

FOREIGN PATENT DOCUMENTS

| | | |
|---|---|---|
| DE | 502132 | 7/1930 |
| DE | 3724427 | 12/1988 |

(Continued)

OTHER PUBLICATIONS

Machine Translation of DE 296 03 807.*

(Continued)

*Primary Examiner* — Bradley King
*Assistant Examiner* — Nicholas J Lane
(74) *Attorney, Agent, or Firm* — Mori & Ward, LLP

(57) ABSTRACT

A control lever including a body portion, a mounting portion, at least one mounting screw, and a lever portion. The body portion has a first section configured to fit within an interior of a bar opening, where the first section is configured to house at least a portion of a control mechanism and has an inclined surface on an outer surface thereof. The mounting portion is configured to slide on the inclined surface, and the mounting screw connects the mounting portion to the body portion. The lever portion is connected to the body portion and is configured to actuate the control mechanism. The mounting screw is configured to slide the mounting portion along the inclined surface so as to push the mounting portion and a side of the first section against an inner surface of the bar opening in order to mount the body portion to the bar opening.

19 Claims, 8 Drawing Sheets

(56) References Cited

U.S. PATENT DOCUMENTS

| | | | |
|---|---|---|---|
| 7,055,323 B2* | 6/2006 | Idei et al. | 60/594 |
| 7,240,772 B2 | 7/2007 | Tsai | |
| 8,056,439 B2* | 11/2011 | Fukui et al. | 74/502.2 |
| 2006/0266594 A1 | 11/2006 | Tsai | |
| 2007/0175290 A1* | 8/2007 | Fujii | 74/502.2 |
| 2009/0114057 A1 | 5/2009 | Fukui et al. | |
| 2009/0121451 A1* | 5/2009 | Chiang | 280/288.4 |
| 2009/0152061 A1* | 6/2009 | Tsai | 188/344 |
| 2009/0152063 A1* | 6/2009 | Tsai | 188/344 |
| 2011/0031078 A1* | 2/2011 | Matsushita et al. | 188/344 |
| 2014/0041379 A1* | 2/2014 | Ruckh et al. | 60/594 |

FOREIGN PATENT DOCUMENTS

| | | |
|---|---|---|
| DE | 29603807 U1 | 5/1996 |
| EP | 0281567 B1 | 9/1988 |
| EP | 1582452 | 10/2005 |
| EP | 1808367 | 7/2007 |
| EP | 2058218 | 5/2009 |
| FR | 663073 | 8/1929 |
| FR | 884159 | 8/1943 |
| FR | 59965 | 9/1954 |
| GB | 190403651 | 0/1904 |
| GB | 140267 | 8/1929 |
| JP | 63-192195 U | 3/1920 |
| JP | 49-000642 U | 8/1943 |
| JP | 61-183793 U | 1/1974 |
| JP | 1-080590 U | 11/1986 |
| JP | 61-183793 U | 11/1986 |
| JP | 1-80590 U | 5/1989 |
| TW | M349884 U | 2/2009 |
| WO | WO 95/07836 | 3/1995 |

OTHER PUBLICATIONS

Extended European Search Report for corresponding EP Application No. 10000049.6-2425, Aug. 22, 2011.

* cited by examiner

_US 8,863,912 B2_

BRAKE CONTROL APPARATUS AND CONTROL LEVER THEREFOR

BACKGROUND OF THE INVENTION

1. Field of the Invention

The present invention relates to a control lever, and more particularly to a control lever with a portion embedded in a bar opening of a bicycle handlebar.

2. Discussion of the Background

Hydraulic brake systems have been utilized on bicycles to provide powerful, safe, and stable braking effects. Such hydraulic brake systems can include a brake lever mounted on a handlebar of a bicycle, a disc brake mounted beside a wheel of the bicycle, and a hydraulic tube interconnecting the brake lever and the disc brake. Due to the size and shape of the components of conventional hydraulic brake levers, such brake levers are typically mounted on the handlebar using a bracket affixed to an outer circumference of the handlebar. However, such a mounting configuration may not be ideal, since many of the components of the hydraulic brake lever may be exposed and therefore susceptible to damage or environmental factors.

Accordingly, an improved hydraulic brake lever is desired.

SUMMARY OF THE INVENTION

An embodiment of the present invention advantageously provides a control lever comprising a body portion, a mounting portion, at least one mounting screw, and a lever portion. The body portion has a first section configured to fit within an interior of a bar opening, where the first section is configured to house at least a portion of a control mechanism, and where the first section has an inclined surface on an outer surface thereof. The mounting portion is configured to slide on the inclined surface. The at least one mounting screw is configured to connect the mounting portion to the body portion. The lever portion is connected to the body portion and is configured to actuate the control mechanism. The at least one mounting screw is configured to slide the mounting portion along the inclined surface so as to push the mounting portion and a side of the first section against an inner surface of the bar opening in order to mount the body portion to the bar opening.

A further embodiment of the present invention advantageously provides a hydraulic brake control apparatus comprising a hydraulic brake control mechanism including a hydraulic brake pressure cylinder, and a control lever. The control lever includes: a body portion having a first section configured to fit within an interior of a bar opening, where the first section houses the hydraulic brake pressure cylinder, and where the first section has an inclined surface on an outer surface thereof; a mounting portion configured to slide on the inclined surface; at least one mounting screw configured to connect the mounting portion to the body portion; and a lever portion connected to the body portion and configured to actuate the control mechanism. The at least one mounting screw is configured to slide the mounting portion along the inclined surface so as to push the mounting portion and a side of the first section against an inner surface of the bar opening in order to mount the body portion to the bar opening.

A still further embodiment of the present invention advantageously provides a control lever comprising a body portion, means for mounting the body portion to a bar opening, and a lever portion. The body portion has a first section configured to fit within an interior of the bar opening, where the first section is configured to house at least a portion of a control mechanism, and where the first section has an inclined surface on an outer surface thereof. The means for mounting includes a mounting portion for sliding along the inclined surface so as to push the mounting portion and a side of the first section against an inner surface of the bar opening. The lever portion is connected to the body portion and configured to actuate the control mechanism.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Figure 1:
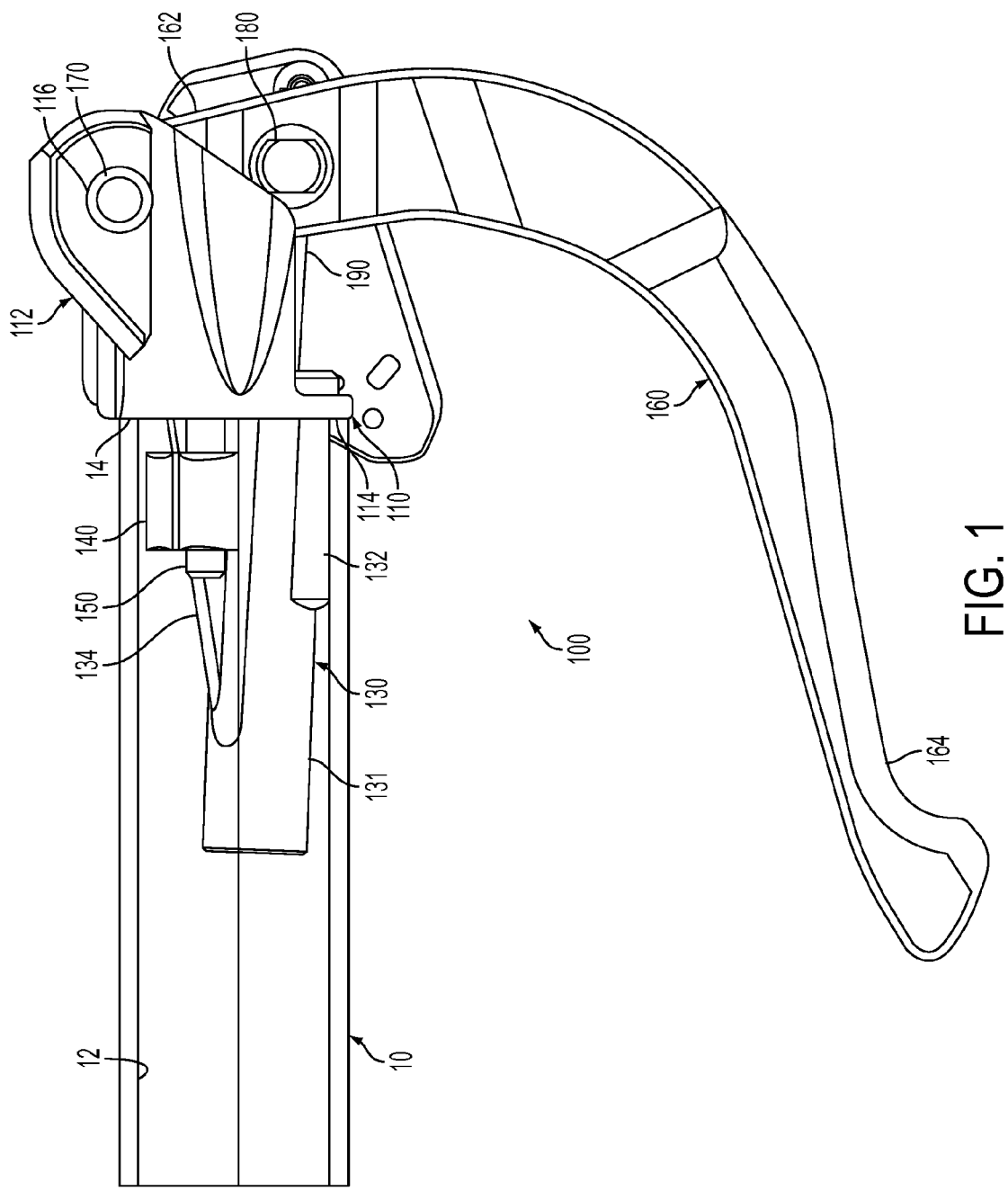
FIG. 1 is a front, elevational view of a hydraulic brake control apparatus including a control lever, which is mounted to a handlebar, according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

FIG. 1 is a front, elevational view of a hydraulic brake control apparatus including a control lever 100, which is mounted to a handlebar 10, according to an embodiment of the present invention. In FIG. 1, for the sake of simplicity and ease of depiction, the handlebar 10 is shown as being transparent so that components of the hydraulic brake control apparatus that are received within the handlebar 10 can be seen therethrough.

FIG. 1 depicts a handlebar 10 that is a tubular member having a hollow interior with an inner surface 12 and an open terminal end 14. The handlebar 10 can be, for example, for a bicycle or other vehicle that utilizes such a hydraulic brake control apparatus. The tubular member can have a circular cross-sectional shape, or other non-circular (e.g., oval, square, etc.) cross-sectional shape if desired. The control lever 100 of the hydraulic brake control apparatus is configured to be mounted to the end 14 of the handlebar 10, with at least a portion of the components of the hydraulic brake apparatus received within the hollow interior of the handlebar 10.

Figure 3:
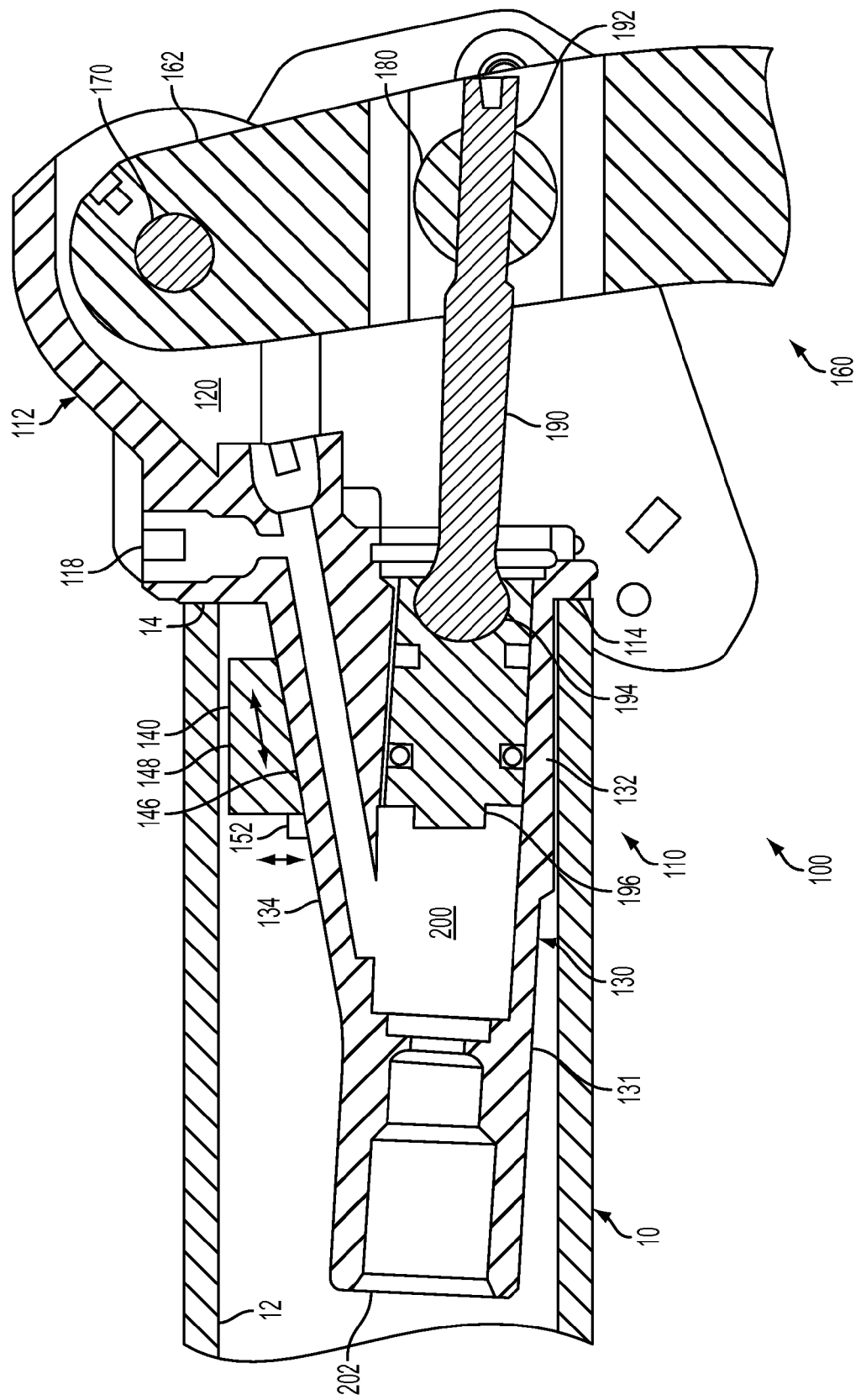
FIG. 3 is a front, partial, cross-sectional view of a hydraulic brake control apparatus including a control lever, which is mounted to a handlebar, according to an embodiment of the present invention.

The hydraulic brake control apparatus includes a hydraulic brake control mechanism including a hydraulic brake pressure cylinder or master cylinder 131, the operation of which is discussed in greater detail with respect to FIG. 3. The hydraulic brake pressure cylinder 131 and various components thereof are housed within a section 130 of a body portion 110 of the control lever 100, and are actuated by a lever portion 160 of the control lever 100.

Referring to FIGS. 1-6B, the control lever 100 includes a body portion 110 having an exterior section 112 that is configured to be outside of the tubular member or bar opening when mounted to the handlebar 10, and the interior section 130 that is configured to fit within the interior of a tubular member or bar opening.

The exterior section 112 of the body portion 110 includes a lip portion 114 that abuts against the end 14 of the handlebar 10 when the control lever 100 is mounted to the handlebar 10. The exterior section 112 includes a hole 116 that extends therethrough that receives an axle 170 that is used to pivotally mount the lever portion 160 to the body portion 110. The exterior section 112 includes an opening 118 that houses a valve that can be used to inject hydraulic fluid into the hydraulic pressure cylinder 131 and/or bleed air out of the hydraulic pressure cylinder 131. The exterior section 112 also includes a recessed portion 120 that receives an upper end 162 of the lever portion 160 for pivotal actuation thereof about the axle 170.

The interior section 130 of the body portion 110 houses the hydraulic brake pressure cylinder 131. The interior section 130 includes a mounting surface 132 on a lower side thereof, and an inclined surface 134 on an outer upper surface thereof. The mounting surface 132 is configured to press against the inner surface 12 of the handlebar 10 when the control lever 100 is mounted on the end 14 of the handlebar 10. The inclined surface 134 is inclined to slant upwards and away from the mounting surface 132 as the inclined surface 134 approaches the exterior section 112.

Figure 6A:
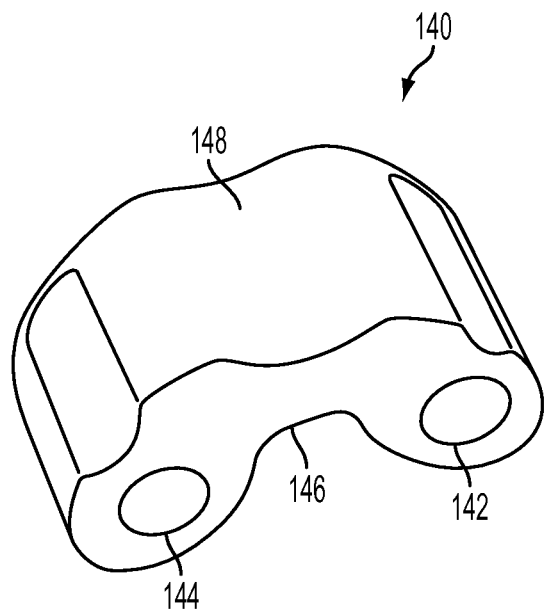
FIG. 6A is a top perspective view of the mounting portion of the control lever of FIG. 4.
Figure 6B:
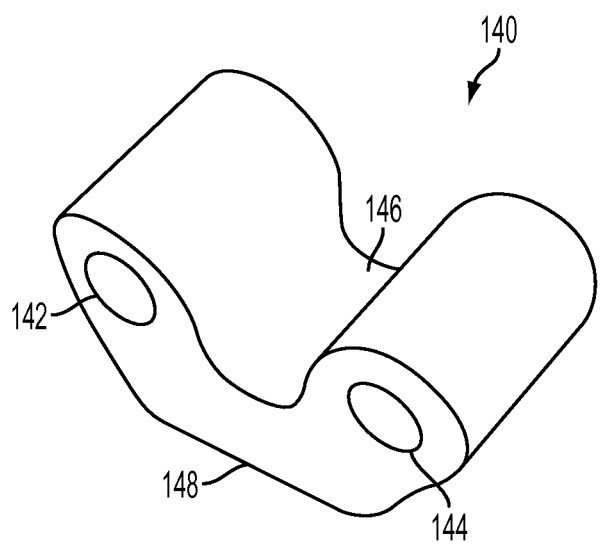
FIG. 6B is a bottom perspective view of the mounting portion of the control lever of FIG. 4.

The control lever 110 includes a mounting portion or mounting block 140 that is connected to the body portion 110 by mounting screws or bolts 150 and 152. The mounting portion 140 has threaded holes 142 and 144 that are threadably engaged to the threaded mounting screws 150 and 152, respectively. The mounting portion 140 has a lower curved surface 146 that is configured to slidably receive or abut the inclined surface 134. The mounting portion 140 has an upper surface 148 that is configured to press against the inner surface 12 of the handlebar 10 when the control lever 100 is mounted on the end 14 of the handlebar 10 and the mounting screws are rotated to draw the mounting portion 140 towards the exterior section 112. As can be seen in FIGS. 6A and 6B, the mounting portion has a generally U-shaped configuration; however, is mounted in an inverted manner (as in FIG. 6A) in FIG. 1.

Figure 2:
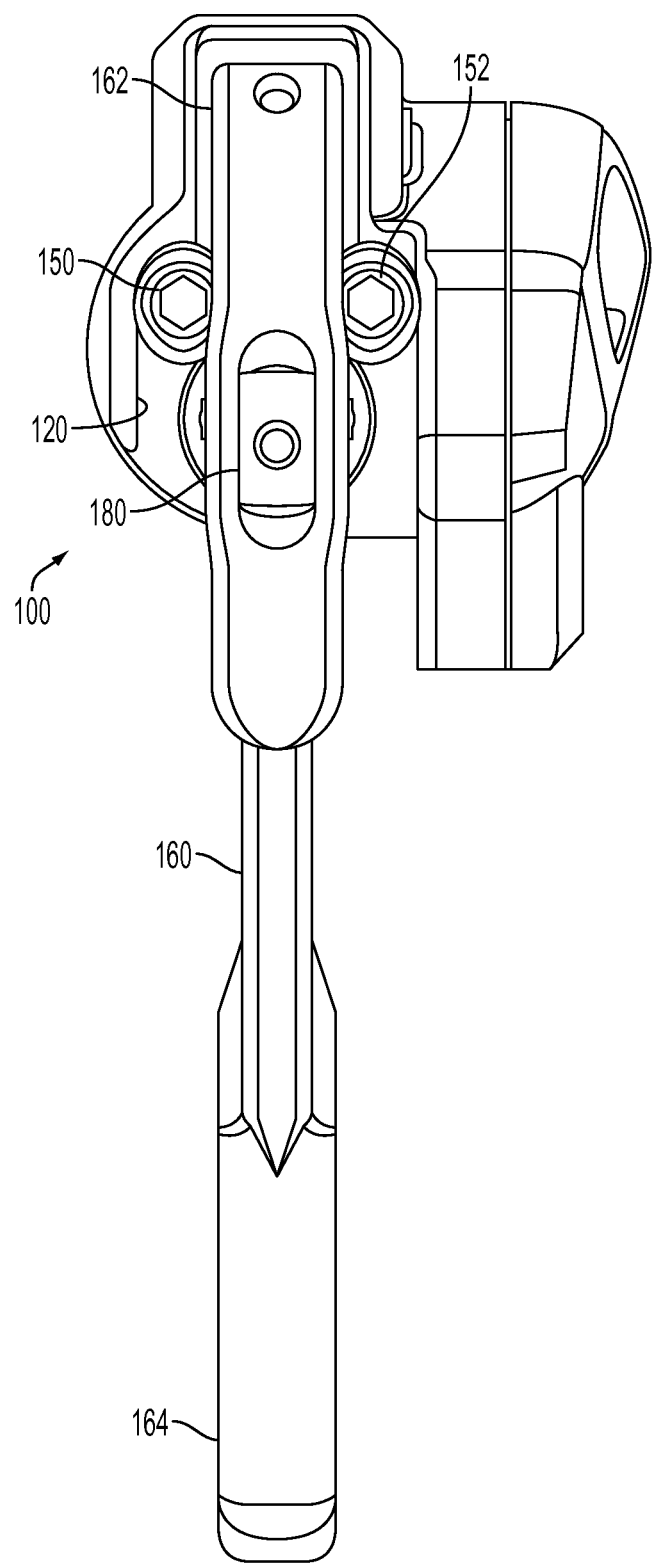
FIG. 2 is a right side elevational view of the hydraulic brake control apparatus including the control lever of FIG. 1.

The mounting screws 150 and 152 are inserted through apertures 122 and 124, respectively, in the exterior section 112 of the body portion 110. The mounting screws can be inserted via the recessed portion 120, as can be seen in FIG. 2. The apertures 122 and 124 are configured to receive the mounting screws 150 and 152 such that the mounting screws can move in a direction perpendicular to a longitudinal axis of the mounting screws when the mounting portion 140 slides along the inclined surface 134. For example, the mounting screws 150 and 152 can be mounted such that they pivot about the head thereof, and/or slide upward or downward. The pivoting/sliding of the mounting screws allows the elevation of the screws or the terminal ends of the screws to change upward or downward as the mounting portion 140 slides to the right or the left, respectively, as shown by the arrows in FIG. 3. Also, as the mounting portion 140 slides to the right, as shown in FIG. 3, the mounting portion 140 moves towards the inner surface 12 of the handlebar 10 in an expanding direction. The mounting screws 150 and 152 are generally provided at a different angle from the hydraulic pressure cylinder 131 and the inclined surface 134 when connected to the mounting portion 140.

The apertures 122 and 124 can provide for such pivoting of the mounting screws 150 and 152, for example, by providing the apertures with a generally truncated cone-shaped cross-section (not shown) when taken along a plane parallel to the cross-sectional plane of FIG. 3, where a narrower end of the truncated cone is on a right side as viewed in the same orientation of FIG. 3 and a wider end of the truncated cone is on a left side. Thus, the heads of the mounting screws 150 and 152 will retain the screws 150 and 152 in connection with the exterior section 112 of the body portion 110 by the narrower end of the truncated cone, and the wider end will allow the terminal ends of the mounting screws to move upward or downward as the mounting portion 140 slides along the inclined surface 134. Alternatively, or in addition to the embodiment described above, the apertures 122 and 124 can provide for movement/pivoting of the mounting screws 150 and 152 by providing the apertures 122 and 124 with a slot shape, for example, a shape having two semi-circular ends connected by two straight sides.

Accordingly, as the mounting screws 150 and 152 are rotated within the apertures 122 and 124, the threads on the mounting screws 150 and 152, which are threadably engaged to the threaded holes 142 and 144 on the mounting portion 140, will act to slide the mounting portion 145 along inclined surface 134. Therefore, in order to tightly mount the control lever 100 to the handlebar 10, the control lever 100 is positioned as shown, for example, in FIG. 3, and then the mounting screws 150 and 152 are rotated in a direction that pulls the mounting portion 140 in a rightward direction towards the exterior section 112 until the upper surface 148 of the mounting portion 140 contacts the inner surface 12 of the handlebar 10. Then, as the mounting screws 150 and 152 are further rotated/tightened, the upper surface 148 of the mounting portion 140, due to interaction between the mounting portion 140 and the inclined surface 134, will push/press against the inner surface 12 of the handlebar and the lower mounting surface 132 will push/press against an opposite side of the inner surface 12 of the handlebar 10 in order to firmly mount the control lever 10 to the handlebar 10.

It is preferable to provide a feature, for example, an expanded portion or pin or other feature at the terminal end of the mounting screws, that prevents the mounting portion from becoming disengaged from the mounting screws.

Alternative embodiments of the control lever can include a configuration in which one mounting screw is utilized. In such a configuration, the mounting portion and/or the inclined surface is/are preferably configured to prevent the ability of the mounting portion to rotate within the interior of the handlebar as the mounting screw is rotated. Further alternative embodiments can be provided in which a channel or groove extends along the upper surface of the inclined surface, and the mounting portion is received within the groove or has a projection that extends within the groove in order to guide the mounting portion along the inclined surface.

As can be seen in FIGS. 1-3, the control lever 100 further includes the lever portion 160. The lever portion 160 has an upper end 162 and a lower end 164. The upper end 162 of the lever portion 160 is pivotally mounted to the exterior section 112 by the axle 170 mounted within hole 116 that extends through the exterior section 112 on both sides of the recessed portion 120. The lower end 164 of the lever portion 160 can be used as a handle by the user to actuate the control mechanism of the hydraulic brake control apparatus by pulling the lower end 164 towards the handlebar 10.

With reference to FIG. 3, the hydraulic brake control apparatus includes a hydraulic brake control mechanism including the hydraulic brake pressure cylinder 131. The hydraulic brake pressure cylinder 131 and various components thereof are housed within a section 130 of a body portion 110 of the control lever 100, and are actuated by a lever portion 160 of the control lever 100. At a distance spaced apart from the axle 170, the lever portion 160 is pivotally attached to a push-rod 190 by a pin 180. The pin 180 is fixed to a first end 192 of the push-rod 190, and the pin 180 is configured to pivot with respect to the lever portion 160. A second end 194 of the push-rod 190 is pivotally fixed to a piston 196 that is slidably provided within a chamber 200 of the hydraulic brake pressure cylinder 131. Hydraulic fluid is provided within the chamber 200.

Therefore, when the lever portion 160 is rotated in a clockwise direction in FIG. 3 about axle 170, the pin 180 will push the push-rod 190 and the piston 196 in a leftward direction within the chamber 200, thereby forcing hydraulic fluid out of port 202. Although not shown in the drawings, port 202 will be connected to a hydraulic tube that will carry the hydraulic fluid to a disc brake mounted beside a wheel of the bicycle in order to actuate the hydraulic brake and apply a braking force to the wheel of the bicycle. Once the user releases the lever portion 160, then the lever portion 160 will rotated in a counterclockwise direction in FIG. 3 about axle 170, and the push-rod 190 and the piston 196 will move in a rightward direction within the chamber 200, thereby releasing the braking force.

Embodiments of the present invention advantageously provide a control lever that includes components thereof that are received within an interior of a handlebar, while still allowing the control lever to be mounted to an inner surface of the handlebar. By mounting such components within an interior of the handlebar, such components can be protected from damage caused by contact with objects and by environmental factors. Such embodiments of a control lever can also provide a very aesthetically pleasing appearance by hiding the components within the hollow handlebar, thereby giving the control lever a very sleek appearance.

While the embodiment set forth above describes the control lever as being utilized as part of a hydraulic brake control apparatus, other embodiments can include the control lever as part of a brake control apparatus that utilize other types of braking systems and configurations. Also, other embodiments can include the control lever as part of other control apparatuses, such as for a derailleur system.

Figure 7A:
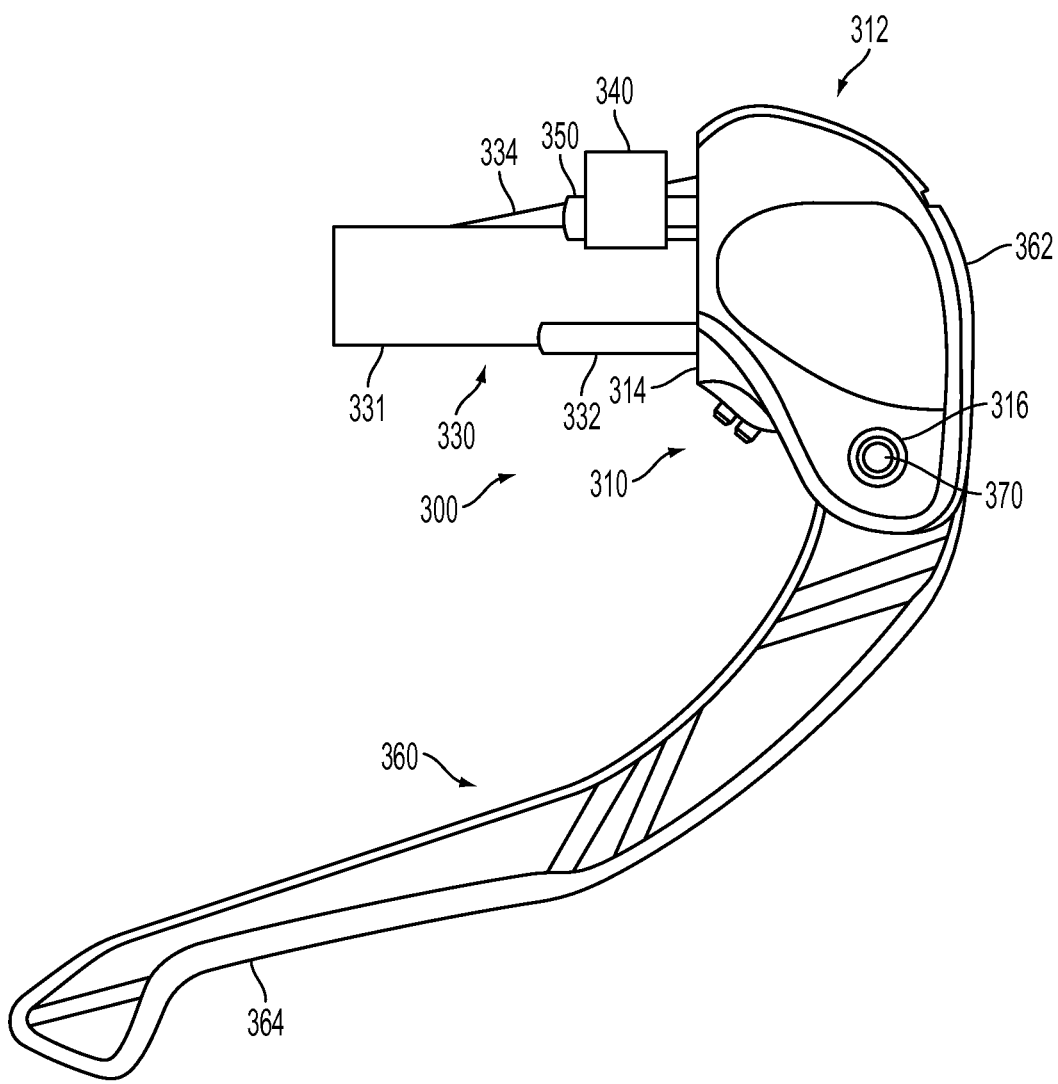
FIG. 7A is a front, elevational view of a cable brake control apparatus including a control lever, according to a further embodiment of the present invention.
Figure 7B:
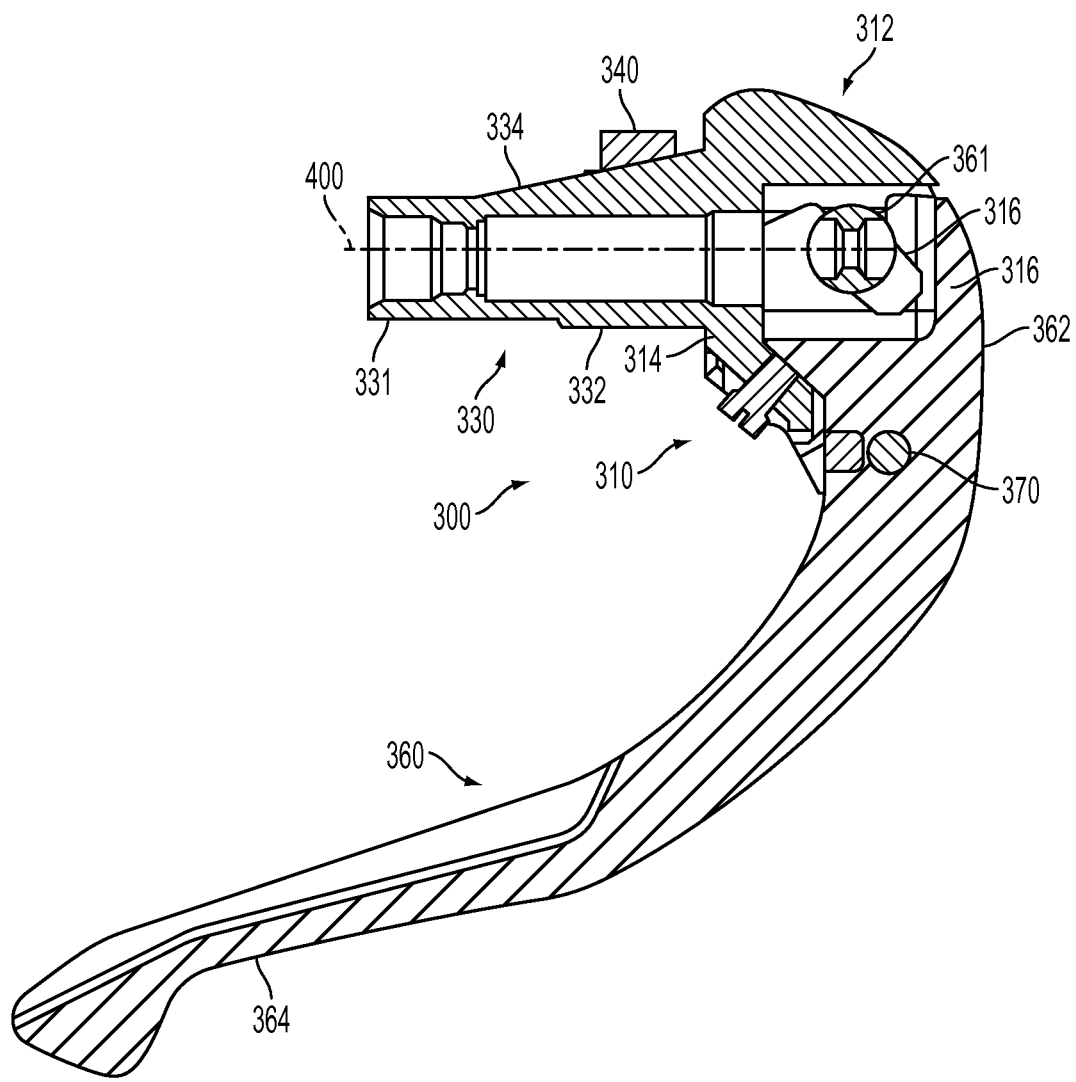
FIG. 7B is a front, cross-sectional view of a cable brake control apparatus including a control lever, according to a further embodiment of the present invention.

FIGS. 7A and 7B are schematic views of a brake control apparatus including a control lever 300, according to an embodiment of the present invention. The brake control apparatus of FIGS. 7A and 7B is a cable braking system (not shown), such as a caliper, disc, or drum brake system. While specific reference will be made thereto, it is to be appreciated that the control apparatus also finds application in other vehicles, such as tricycles, motorcycles, etc., as well as in other control lever actuated systems, such as gear shift systems.

The control lever 300 is configured to be mounted to a handlebar that is a tubular member having a hollow interior with an inner surface and an open terminal end. The brake control apparatus includes a cable brake control mechanism including a cable brake cylinder 331. The cable brake cylinder 331 and various components thereof are housed within a section 330 of a body portion 310 of the control lever 300, and are actuated by a lever portion 360 of the control lever 300. The configuration of the cable braking components of the control lever and the operation thereof can be provided, for example, as shown and described in U.S. Pub. No. 2009/0114057 A1, which is incorporated by reference herein in its entirety.

The control lever 300 includes a body portion 310 having an exterior section 312 that is configured to be outside of the tubular member or bar opening when mounted to the handlebar, and the interior section 330 that is configured to fit within the interior of a tubular member or bar opening.

The exterior section 312 of the body portion 310 includes a lip portion 314 that abuts against the end of the handlebar when the control lever 300 is mounted to the handlebar. The exterior section 312 includes a hole 316 that extends therethrough that receives an axle 370 that is used to pivotally mount the lever portion 360 to the body portion 310. The exterior section 312 also includes a recessed portion that receives an upper end 362 of the lever portion 360 for pivotal actuation thereof about the axle 370.

The interior section 330 of the body portion 310 houses the brake cylinder 331. The interior section 330 includes a mounting surface 332 on a lower side thereof, and an inclined surface 334 on an outer upper surface thereof. The mounting surface 332 is configured to press against the inner surface of the handlebar when the control lever 300 is mounted on the end of the handlebar. The inclined surface 334 is inclined to slant upwards and away from the mounting surface 332 as the inclined surface 334 approaches the exterior section 312.

Figure 4:
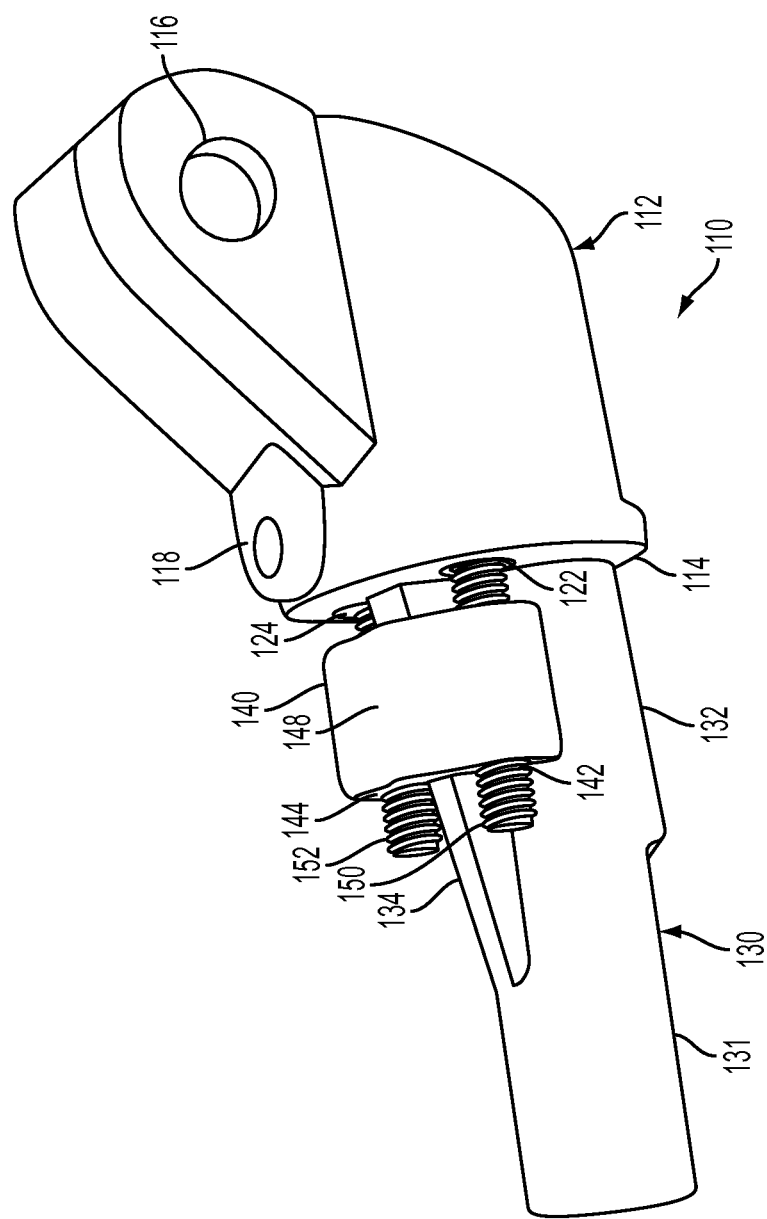
FIG. 4 is a front, top, left perspective view of a body portion of the control lever including a mounting portion and mounting screws, according to an embodiment of the present invention.
Figure 5:
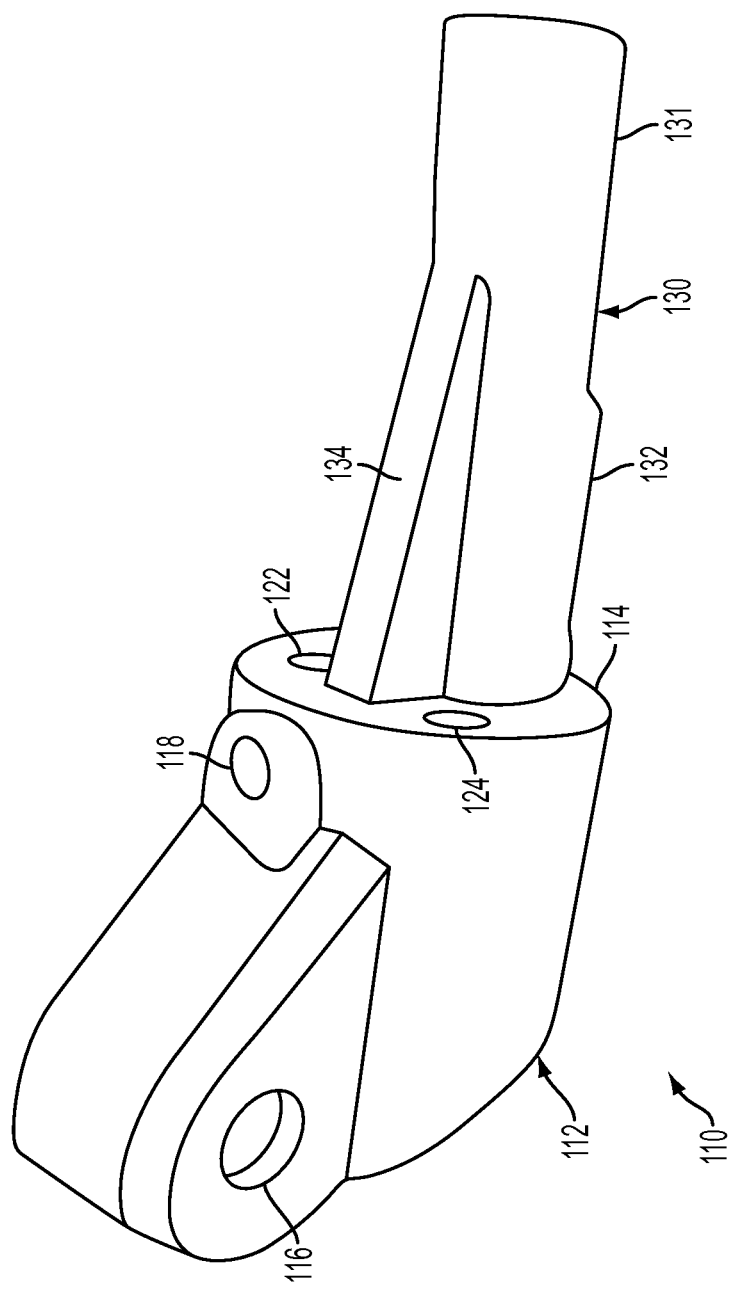
FIG. 5 is a rear, top, left perspective view of the body portion of the control lever of FIG. 4.

The control lever 310 includes a mounting portion or mounting block 340 that is connected to the body portion 310 by mounting screws or bolts 350 in the same manner as in the previous embodiment (see FIG. 4). The mounting portion 340 has threaded holes that are threadably engaged to the threaded mounting screws in the same manner as in the previous embodiment and that operate in the same manner as in the previous embodiment. Thus, the mounting portion 240 has an upper surface that is configured to press against the inner surface of the handlebar when the control lever 300 is mounted on the end of the handlebar and the mounting screws are rotated to draw the mounting portion 340 towards the exterior section 312.

The lever portion 360 has an upper end 362 and a lower end 364. The upper end 362 of the lever portion 360 is pivotally mounted to the exterior section 312 by the axle 370 mounted within hole 316 that extends through the exterior section 312 on both sides of the recessed portion. The lower end 364 of the lever portion 360 can be used as a handle by the user to actuate the control mechanism of the cable brake control apparatus by pulling the lower end 364 towards the handlebar. When the lower end 364 of the lever portion 360 is pulled upward by the user (i.e., in a clockwise direction about axle 370), the lever portion 360 pivots about axle 370 and a slot 361 on a terminal end of the upper end 362 pulls a cable 400 in a rightward direction in FIG. 7B, which is connected to thereby actuates a brake (not shown) mounted beside a wheel of the bicycle in order to apply a braking force to the wheel of the bicycle. Once the user releases the lever portion 360, then the lever portion 360 will rotated in a counterclockwise direction in FIG. 7B about axle 370, and the cable 400 will move in a leftward direction, thereby releasing the braking force.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A control lever assembly comprising:
a body portion having a first section configured to fit within an interior of a bar opening, said first section being configured to house at least a portion of a hydraulic operated device of a control mechanism, said first section having an inclined surface on an outer circumferential surface thereof;
a mounting portion configured to slide on said inclined surface;
at least one mounting screw configured to connect said mounting portion to said body portion; and
a lever portion connected to said body portion and configured to actuate the control mechanism,
wherein said at least one mounting screw is configured to slide said mounting portion along said inclined surface so as to push said mounting portion and a side of said first section against an inner surface of the bar opening in order to mount said body portion to the bar opening,
wherein said at least one mounting screw does not extend through said inclined surface,
wherein said mounting portion moves in an expanding direction when said mounting portion slides in a first direction along said inclined surface, the expanding direction being a direction extending outwardly towards a surface of the interior of the bar opening when the first section is fit within the interior of the bar opening,
wherein said at least one mounting screw includes a first mounting screw and a second mounting screw,
wherein said first mounting screw and said second mounting screw are each threadably engaged to a respective threaded hole on said mounting portion, and
wherein said mounting portion has generally U-shaped cross-section.

2. The control lever assembly according to claim 1, wherein said body portion includes a second section configured to be mounted outside of the interior of the bar opening.

3. The control lever assembly according to claim 2, wherein said at least one mounting screw extends through an aperture in said second section, wherein said at least one mounting screw is threadably engaged to a threaded hole on said mounting portion.

4. The control lever assembly according to claim 3, wherein said aperture in said second section is configured to receive said at least one mounting screw such that said at least one mounting screw moves in a direction substantially perpendicular to a longitudinal axis of said at least one mounting screw when said mounting portion slides along said inclined surface.

5. A hydraulic control apparatus comprising:
a hydraulic control mechanism including a hydraulic operated device; and
a control lever assembly including:
a body portion having a first section configured to fit within an interior of a bar opening, said first section housing at least a portion of said hydraulic operated device, said first section having an inclined surface on an circumferential outer surface thereof;
a mounting portion configured to slide on said inclined surface;
at least one mounting screw configured to connect said mounting portion to said body portion; and
a lever portion connected to said body portion and configured to actuate said control mechanism,
wherein said at least one mounting screw is configured to slide said mounting portion along said inclined surface so as to push said mounting portion and a side of said first section against an inner surface of the bar opening in order to mount said body portion to the bar opening,
wherein said at least one mounting screw does not extend through said inclined surface,
wherein said mounting portion moves in an expanding direction when said mounting portion slides in a first direction along said inclined surface, the expanding direction being a direction extending outwardly towards a surface of the interior of the bar opening when the first section is fit within the interior of the bar opening,
wherein said at least one mounting screw includes a first mounting screw and a second mounting screw,
wherein said first mounting screw and said second mounting screw are each threadably engaged to a respective threaded hole on said mounting portion, and
wherein said mounting portion has generally U-shaped cross-section.

6. The hydraulic control apparatus according to claim 5, wherein said body portion includes a second section configured to be mounted outside of the interior of the bar opening.

7. The hydraulic control apparatus according to claim 6, wherein said at least one mounting screw extends through an aperture in said second section, wherein said at least one mounting screw is threadably engaged to a threaded hole on said mounting portion.

8. The hydraulic control apparatus according to claim 7, wherein an aperture in said second section is configured to receive said at least one mounting screw such that said at least one mounting screw moves in a direction substantially perpendicular to a longitudinal axis of said at least one mounting screw when said mounting portion slides along said inclined surface.

9. The control lever assembly according to claim 1, wherein the mounting portion is offset from a center axis extending through the bar opening.

10. The control lever assembly according to claim 1, wherein the at least one mounting screw is offset from a center axis extending through the bar opening.

11. The control lever assembly according to claim 1, wherein the inclined surface is offset from a center axis extending through the bar opening.

12. The control lever assembly according to claim 1, wherein said at least one mounting screw is threadably engaged to said mounting portion.

13. The hydraulic control apparatus according to claim 5, wherein the mounting portion is offset from a center axis extending through the bar opening.

14. The hydraulic control apparatus according to claim 5, wherein the at least one mounting screw is offset from a center axis extending through the bar opening.

15. The hydraulic control apparatus according to claim 5, wherein the inclined surface is offset from a center axis extending through the bar opening.

16. The hydraulic control apparatus according to claim 5, wherein said at least one mounting screw is threadably engaged to said mounting portion.

17. The control lever assembly according to claim 1, wherein said at least one mounting screw extends from a surface of the body portion, the surface of the body portion being substantially perpendicular to an axis of the bar opening.

18. The hydraulic control apparatus according to claim 5, wherein said at least one mounting screw extends from a surface of the body portion, the surface of the body portion being substantially perpendicular to an axis of the bar opening.

19. The hydraulic control apparatus according to claim 5, wherein said hydraulic operated device has an outlet port configured to connect to a hydraulic tube connected to a hydraulic brake.

* * * * *